United States Patent [19]

Fukuda et al.

[11] Patent Number: 4,497,021
[45] Date of Patent: Jan. 29, 1985

[54] MICROCOMPUTER SYSTEM OPERATING IN MULTIPLE MODES

[75] Inventors: Joji Fukuda, Yokohama; Yutaka Yamashiki, Atsugi, both of Japan

[73] Assignee: Sony Corporation, Tokyo, Japan

[21] Appl. No.: 391,857

[22] Filed: Jun. 24, 1982

[30] Foreign Application Priority Data

Jun. 26, 1981 [JP] Japan .................................. 56-99868

[51] Int. Cl.³ .............................................. G06F 1/00
[52] U.S. Cl. ..................................................... 364/200
[58] Field of Search ... 364/200 MS File, 900 MS File

[56] References Cited

U.S. PATENT DOCUMENTS 4,080,659  3/1978  Francini ........................ 364/200 X Primary Examiner—Raulfe B. Zache
Attorney, Agent, or Firm—Lewis H. Eslinger; Alvin Sinderbrand

[57] ABSTRACT

A microcomputer system having a central processing unit (CPU) responsive to mode control signals for operating the system in respective operating modes, a power supply circuit for supplying a reset signal to the CPU, a memory, and a keyboard, is provided with a mode selecting circuit which includes a logical gate with inputs and with outputs coupled to the CPU for supplying the mode control signals, a selector switch device connected with the logical gate for selectively determining which of the mode control signals is supplied to the CPU, and a sensing means connected with the logical gate for causing one of the mode control signals to be applied to the CPU when the reset signal is supplied to the CPU and the keyboard is simultaneously actuated, irrespective of the condition of the selector switch device.

14 Claims, 4 Drawing Figures

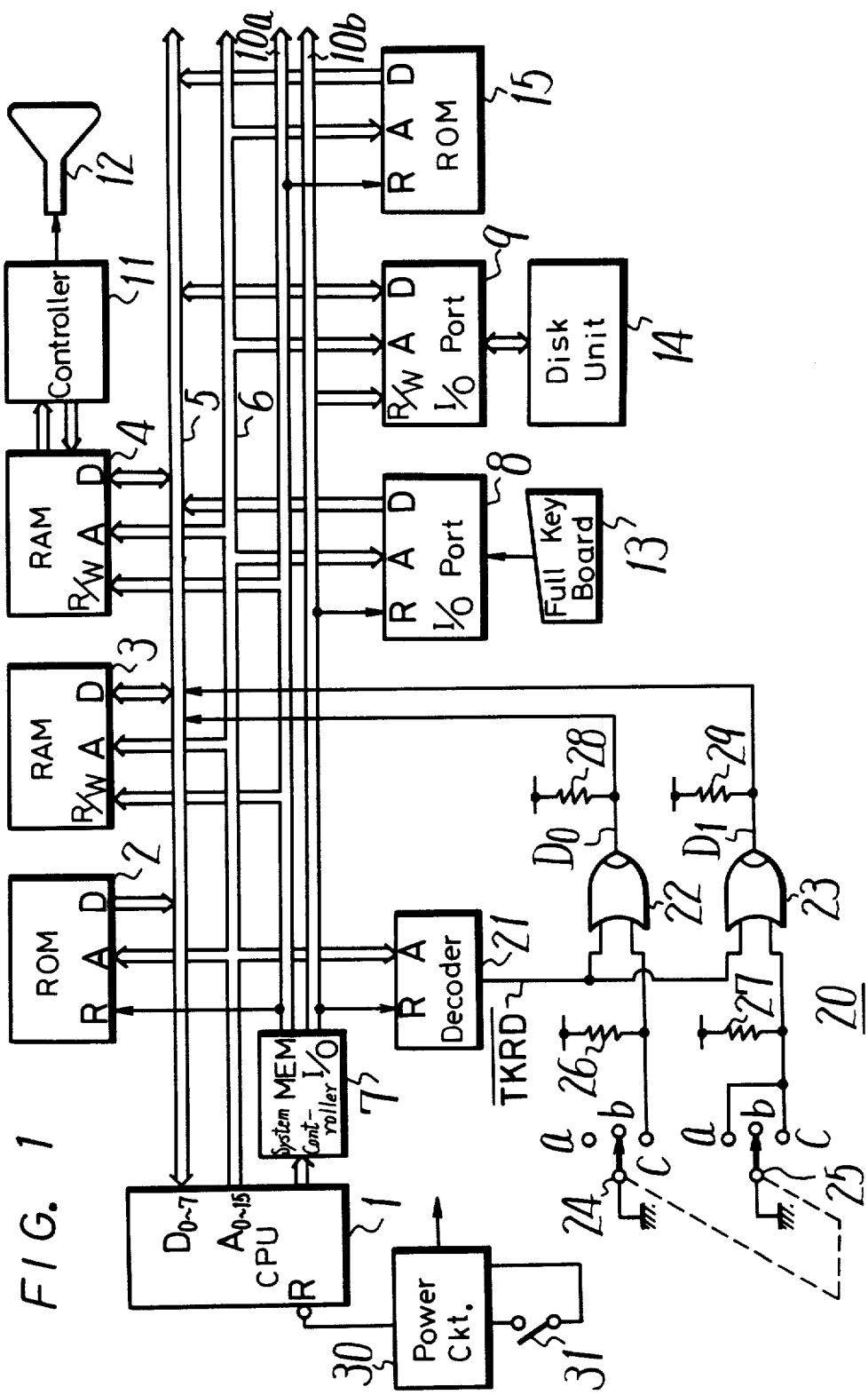
F I G. 1

| | Contact | $D_1$ | $D_0$ | Operation Mode |
|---|---|---|---|---|
| Key Is Not Pushed $\overline{TKRD}$='0' | a | 0 | 1 | First Turn Key Mode |
| | b | 1 | 1 | General Purpose |
| | c | 0 | 0 | Second Turn Key Mode |
| Key Is Pushed $\overline{TKRD}$='1' | a | 1 | 1 | General Purpose |
| | b | 1 | 1 | General Purpose |
| | c | 1 | 1 | General Purpose |

MICROCOMPUTER SYSTEM OPERATING IN MULTIPLE MODES

BACKGROUND OF THE INVENTION

1. Field of the Invention

This invention relates to microcomputer systems, and more particularly, to a novel mode selecting circuit for selecting the operating mode of a microcomputer system.

2. Description of the Prior Art

Conventional personal computers generally include a general purpose resident program, such as BASIC, which operates the personal computer when it is powered up. Special purpose operating programs are sometimes also included in personal computers and dedicate the personal computer for a specific operation. For example, a personal computer can be configured by a special program to be particularly suited to accounting applications. The special application programs are frequently stored in a special memory, or on floppy disks. When the personal computer is powered up, the program is loaded from the disk unit into the main memory of the personal computer.

In a personal computer which includes both a general purpose program and special purpose application programs, a switch such as a turn key system is usually provided for selecting the operating mode of the computer system. Generally the switch is installed on a back or side panel of the computer so that the operating mode of the computer is not accidently changed when the system is powered up. However, it is also troublesome to change the operating mode of such a computer system because the switch is inconveniently located.

OBJECTS AND SUMMARY OF THE INVENTION

Accordingly, it is an object of the present invention to provide a microcomputer system in which the operating mode can be easily selected.

It is another object of the present invention to provide a microcomputer system in which a key selects the operating mode of the system from either a program stored in the system memory or a program stored in an external memory, such as on a disk.

It is a further object of the present invention to provide a microcomputer system in which the operating mode can be selected in spite of the position of a selecting key.

It is yet a further object of the present invention to provide a microcomputer system in which a predetermined operating mode is selected when a power switch is turned on and any of the keys on a keyboard is actuated.

According to an aspect of the present invention, a circuit is disclosed for use with a microcomputer system having a central processing unit (CPU) responsive to mode control signals for operating the system in accordance with one of several respective operating modes, a power supply circuit for supplying a reset signal to the CPU, a memory, and a key board. A logical gate has first and second inputs and outputs, with the outputs connected to the central processing unit to supply the mode control signal to the central processing unit. A selector switch device is connected to the first input and selectively determines which of the mode control signals is supplied from the logical gate to the CPU to achieve the selected operating mode. A sensing means is connected to the second input and supplies from the logical gate one of the mode control signals characteristic of one of the operating modes when the reset signal is supplied to the central processing unit simultaneously with actuation of the keyboard, irrespective of the selector switch.

The above, and other objects, features and advantages of the present invention, will be apparent in the following detailed description taken in conjunction with the accompanying drawings in which like references designate the same or like elements.

BRIEF DESCRIPTION OF THE DRAWINGS

FIG. 1 is a block diagram showing a microcomputer system according to an embodiment of the present invention;

DESCRIPTION OF THE PREFERRED EMBODIMENTS

Figure 2:
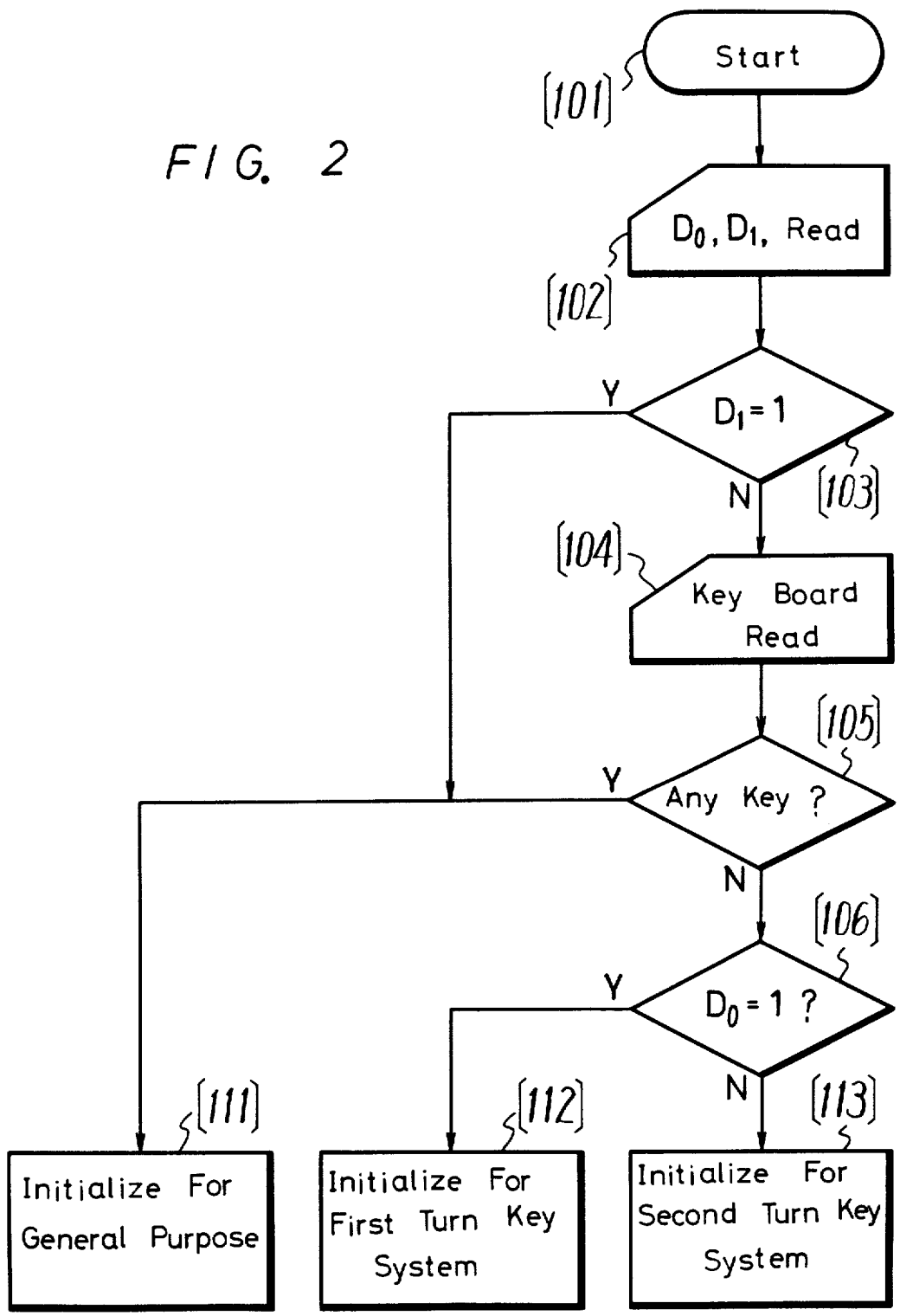
FIG. 2 is a flow chart of a program used in accord with the invention.

Referring in detail to FIG. 1, a central processing unit 1 (CPU) for 8-bit parallel processing is there shown to have data terminals $D_0$ to $D_7$ and address terminals $A_0$ to $A_{15}$. The data terminals $D_0$ to $D_7$ are coupled to a read only memory 2 (ROM) at the input terminal D of the latter by a data bus 5. The ROM 2 has stored therein, in a preferred embodiment, a monitor program, a BASIC interpreter, and a mode selecting program illustrated with the flow chart of FIG. 2. Addresses from the CPU 1 are supplied from address terminals $A_0$ to $A_{15}$ to an address terminal A of ROM 2 by an address bus 6. A random access memory 3(RAM) provides a work area for CPU 1, and a program area for the user. The address terminals $A_0$ to $A_{15}$ of CPU 1 are coupled to an address terminal A of RAM 3, and data terminals $D_0$ to $D_7$ of the CPU 1 are coupled to a data terminal D of the RAM 3 by address bus 6 and data bus 5, respectively.

A second random access memory 4 (RAM) is coupled to a CRT controller 11 for a CRT 12 (cathode ray tube) and functions as a video RAM. The controller 11 reads data stored in RAM 4 and supplies the data to CRT 12 for display. The data terminals $D_0$ to $D_7$ of CPU 1 are connected through data bus 5 to a data terminal D of RAM 4, and address terminals $A_0$ to $A_{15}$ are connected through address bus 6 to an address terminal A of RAM 4.

The address terminals $A_0$ to $A_{15}$ of CPU 1 are connected to address terminals A of I/O ports 8, 9 and an additional read only memory 15 (ROM) by address bus 6, and data terminals $D_0$ to $D_7$ of CPU 1 are connected to data terminals D of I/O ports 8, 9 by data bus 5. A control bus 10a carries read/write control signals from a terminal MEM of a system controller 7 and supplies read control signals to terminals R of ROM 2 and ROM 15, while bus 10a supplies read/write control signals to terminals R/W of RAM 3 and RAM 4. Another control bus 10b carries read/write control signals from a terminal I/O of system controller 7 and supplies such read control signals to terminals R of a decoder 21 and of I/O port 8 and ROM 15, while bus 10b supplies read/- write control signals to terminal R/W of I/O port 9. The address terminals $A_0$ to $A_{15}$ of CPU 1 are connected to address terminal A of decoder 21 by address bus 6. The functions of decoder 21 will be described more fully below.

In the illustrated embodiment, an I/O device such as a keyboard 13 is coupled to I/O port 8. The keyboard 13 generates signals which are supplied to CPU 1 via bus 5. A disk unit 14 is coupled to I/O port 9 and hence to CPU 1 through data bus 5. The ROM 15 provides a second memory medium for CPU 1 through data bus 5.

In a preferred embodiment, disk unit 14 stores a special program which configures the microcomputer system in a first operating mode, or first turn key mode. ROM 15 stores a second special program which configures the microcomputer system to operate in a second operating mode, or second turn key mode.

Reference numeral 20 designates a mode selecting circuit for selecting the operating mode of the microcomputer system. System controller 7 supplies a read signal $\overline{IORD}$ by bus 10b and an address signal by address bus 6 to decoder 21. Decoder 21 supplies a read signal $\overline{TKRD}$ to a pair of logical OR circuits or gates 22 and 23. In a preferred embodiment of the present invention, the OR circuits 22 and 23 are of the open collector type, and have pull-up resistors 26 and 27 coupled to inputs of OR gates 22, 23, respectively.

The input to OR gate 22 having pull-up resistor 26 connected thereto is coupled to a fixed contact c of a switch 24. In a similar manner, the input to OR gate 23 having pull-up resistor 27 connected thereto is coupled to fixed contacts a and c of a second switch 25. The switches 24, 25 have ganged movable contacts connected to ground and to contacts a, b and c. With reference to switch 24, the respective input to OR gate 22 is connected to ground only when switch 24 is placed in position c. With reference to switch 25, the input to OR gate 23 is connected to ground when switch 25 is engaged with either of its fixed contacts a and c.

The output of OR gate 22 is coupled to a least significant bit line $D_0$ of data bus 5. The output of OR gate 23 is connected to a bit line $D_1$ of data bus 5. Data bus 5 can be an open collector type device, with pull-up resistors 28, 29 provided for the input lines $D_0$, $D_1$, respectively.

A power circuit 30 supplies power to the microcomputer system when a power switch 31 is closed or placed in the ON position, and at the same time as the power is switched on, a reset signal is applied from circuit 30 to CPU 1. The operations caused by the reset signal from power circuit 30 will be explained more fully below.

The output of OR gate 22 with reference to the position of switch 24 is next to be described. Since switches 24, 25 are ganged, the position of switch 25 will coincide with the position of switch 24. When switch 24 is positioned to engage its a or b contact, a "1" is supplied to the input of OR gate 22, connected to switch 24 and hence, $D_0$ is "1". When switch 24 is positioned to engage its c contact, however, a "0" is supplied to the respective input of OR gate 22. In the latter condition, the output of OR gate 22 is dependent upon the input at the other terminal, i.e., the signal $\overline{TKRD}$. (The signal $\overline{TKRD}$ will be explained below).

The output of OR gate 23 with reference to the position of switch 25 is next to be described. When switch 25 is positioned to engage its a or c contact, a "0" is supplied to the respective input of OR gate 23, and the output $D_1$ is then dependent upon the other input to OR gate 23, i.e., the signal $\overline{TKRD}$. When switch 25 is positioned to engage its b contact, a "1" is supplied to OR gate 23, and thus, $D_1$ is "1".

The determination of the operating mode of a microcomputer system in accordance with the above embodiment of the present invention will next be described with reference to the state diagram of FIG. 3, in which the microcomputer system is shown to be selectively operable in one of three modes: namely a first turn key mode, a second turn key mode, and a general purpose mode. When no key of keyboard 13 is actuated, the input signal $\overline{TKRD}$ to OR gates 22, 23 is "0", and the operating mode of the microcomputer system is then determined by selector switches 24, 25. When selector switches 24, 25 are positioned to engage their a contacts, the input signals $D_0$ and $D_1$ to data bus 5 are "1" and "0", respectively. When these input signals $D_0$="1" and $D_1$="0" are supplied to CPU 1, a first turn key mode is selected which may, for example, call for a program stored on disk unit 14 to be loaded into ROM 2 for operation of the microcomputer system. When selector switches 24, 25 are positioned to engage their b contacts, the input signals $D_0$, $D_1$ to data bus 5 are both "1". Accordingly, the micro-computer system is operated as a general purpose computer according to a program stored in the ROM 2. When switches 24, 25 are positioned to engage their c contacts, the output signals $D_0$ and $D_1$ from OR gates 22 and 23 are both "0", and the microcomputer system is thereby configured in a second turn key mode which may be, for example, in accordance with a program stored in ROM 15.

When a key is actuated on keyboard 13, simultaneously with the switching on of the power by power switch 31, CPU 1 receives the reset signal from power circuit 30 and supplies a signal to system controller 7. System controller 7 then supplies a signal $\overline{IORD}$ to decoder 21 which supplies an input signal to the inputs of OR gates 22, 23. By reason of the foregoing, OR gates 22 and 23 provide output signals $D_0$ and $D_1$ which are "1" regardless of the other inputs to OR gates 22, 23 from selector switches 24, 25. Accordingly, $D_0$ and $D_1$ are each "1" regardless of the position of selector switches 24, 25 when a key on the keyboard 13 is depressed and the power is switched on. Since $D_0$ and $D_1$ supplied to data bus 5 and CPU 1 are both "1", the microcomputer system operates in a general purpose operating mode.

The operation of the microcomputer system according to the program stored in ROM 2 will now be described with reference to the flow chart shown on FIG. 2. At step 101, the microcomputer is started, for example, by actuation of power switch 31 associated with power circuit 30. At step 102, the inputs $D_0$ and $D_1$ from OR gates 22, 23 are read. At step 103, a decision is made as to the signal $D_1$. If $D_1$ is "1", the program proceeds to step 111 where the microcomputer system is initialized as a general purpose computer.

At step 103, if $D_1$ is "0", the program proceeds to step 104, where keyboard 13 is read. At step 105, a decision is made as to the condition of keyboard 13. If a key of keyboard 13 is actuated, the program proceeds to step 111, where the microcomputer system is again initialized as a general purpose computer.

At step 105, if no key of keyboard 13 is actuated, the program proceeds to step 106, where another test is made as to the status of $D_0$. If $D_0$ is "1", the program proceeds to step 112, where the microcomputer system is initialized as a first turn key system. If, on the other hand, $D_0$ is "0", the program proceeds to step 113, where the microcomputer system is initialized as a second turn key system.

Figures 3, 4:
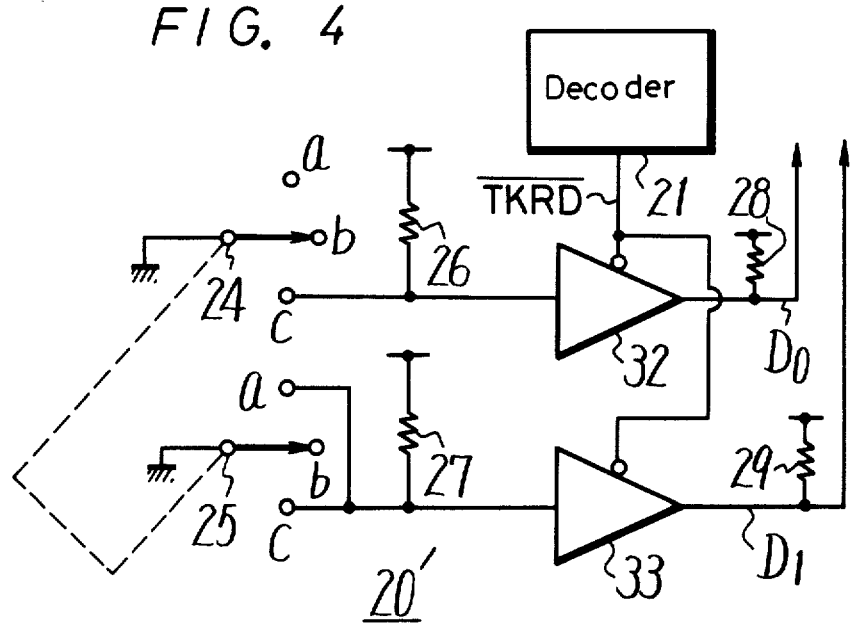
FIG. 3 is a state diagram illustrating the operating modes of the microcomputer system.
FIG. 4 is a block diagram showing a portion of a microcomputer system according to another embodiment of the present invention.

FIG. 4 illustrates a mode selecting circuit 20' which may be used in place of the circuit 20 of FIG. 1 in a microcomputer system according to another embodiment of the present invention, and in which tri-state devices 32 and 33 are used instead of the OR gates 22 and 23 of FIG. 1. The switches 24, 25 supply signals to the inputs of tri-state devices 32, 33, in a fashion similar to the above described supplying of signals to the OR gates 22, 23. In FIG. 4, however, the signal $\overline{TKRD}$ is supplied as an inhibit signal to an enable input of each of tri-state devices 32, 33. When the inhibit signal is supplied to the enable inputs of the tri-state devices 32, 33, that is, when $\overline{TKRD}=$"0", the tri-state devices 32, 33 assume a condition of high impedance. The data bus 5, operating as an open collector device, sees $D_0=$"1" and $D_1=$"1" because of the pull-up resistors 28, 29, irrespective of the position of switches 24 and 25. When no input signal $\overline{TKRD}$ is supplied to the enable input of the tri-state devices 32, 33, that is, $\overline{TKRD}=$"0", the position of the selector switches 24, 25 determines the operating mode of the microcomputer system as in FIG. 1.

Although specific embodiments of the invention have been described in detail herein with reference to the accompanying drawings, it is to be understood that the invention is not limited to those precise embodiments, and that various changes and modifications may be effected therein by one skilled in the art without departing from the scope and spirit of the invention as defined in the appended claims.

What is claimed is:

1. A mode selecting circuit for use with a microcomputer system having a central processing means responsive to mode control signals for operating said system in accordance with a plurality of respective operating modes, a power supply circuit for supplying a reset signal to said central processing means, memory means, and a keyboard, comprising;
   gate means having first and second input means and output means, said output means being connected with said central processing means for supplying said mode control signals to the latter;
   selector switch means connected with said first input means and being operable for selectively determining which of said mode control signals is supplied from said gate means to said central processing means for achieving the respective operating mode; and
   sensing means connected to said second input means of said gate means for supplying from said gate means one of said mode control signals characteristic of one of said operating modes when said reset signal is supplied to said central processing means simultaneously with actuation of said keyboard irrespective of said selector switch means.

2. A mode selecting circuit for use with a microcomputer system having a central processing means responsive to mode control signals for operating said system in accordance with a plurality of respective operating modes, a power supply circuit for supplying a reset signal to said central processing means, memory means with at least one program stored therein for operating said microcomputer system in said one of the operating modes, and a keyboard, comprising:
   gate means having first and second input means and output means, said output means being connected with said central processing means for supplying said mode control signals to the latter, said gate means suplying said one mode control signal characteristic of said one operating mode to said central processing means to operate said microcomputer system with said at least one stored program;
   selector switch means connected with said first input means and being operable for selectively determining which of said mode control signals is supplied from said gate means to said central processing means for achieving the respective operating mode; and
   sensing means connected to said second input means of said gate means for supplying from said gate means one of said mode control signals characteristic of one of said operating modes when said reset signal is supplied to said central processing means simultaneously with actuation of said keyboard irrespective of said selector switch means.

3. The mode selecting circuit of claim 2; in which said memory means has another program stored therein for operating said microcomputer system in another of said operating modes, and said gate means supplies said mode control signal characteristic of said other operating mode to said central processing means to operate said microcomputer system with said other stored program.

4. The mode selecting circuit of claim 2; in which said microcomputer system has an external memory means with another program stored therein for operating said microcomputer system in another of said operating modes, and said gate means supplies said mode control signal characteristic of said other operating mode to said central processing means to operate said microcomputer system with said other stored program.

5. The mode selecting circuit of claim 4; in which said external memory means is a disk drive unit.

6. The mode selecting circuit of claim 1; in which said power supply circuit has a power switch, and actuation of said power switch causes said power supply circuit to supply said reset signal to said central processing means.

7. The mode selecting circuit of claim 6; in which said power supply circuit supplies said reset signal to said central processing means when said power supply circuit is turned on.

8. A mode selecting circuit for use with a microcomputer system having a central processing means responsive to mode control signals for operating said system in accordance with a plurality of respective operating modes, a data bus coupled to said central processing means, a power supply circuit for supplying a reset signal to said central processing means, memory means, and a keyboard, comprising:
   gate means having first and second input means and output means, said output means being connected with said central processing means for supplying said mode control signals to the latter, said gate means comprising a pair of logical "OR" gates coupled to said data bus;
   selector switch means connected with said first input means and being operable for selectively determining which of said mode control signals is supplied from said gate means to said central processing means for achieving the respective operating mode; and
   sensing means connected to said second input means of said gate means for supplying from said gate means one of said mode control signals characteristic of one of said operating modes when said reset signal is supplied to said central processing means simultaneously with actuation of said keyboard irrespective of said selector switch means.

9. The mode selecting circuit of claim 8 wherein said data bus comprises an open-collector device; and further including a pull-up resistor coupled to each of said output means of said gate means.

10. The mode selecting circuit of claim 8; in which said gate means comprise open-collector devices, and further including a pull-up resistor coupled to each of said first input means of said gate means.

11. The mode selecting circuit of claim 1; in which a data bus is coupled to said central processing means, and said gate means comprise a pair of tri-state gates coupled to said data bus.

12. The mode selecting circuit of claim 11; in which said tri-state gates are open-collector devices, and further including a pull-up resistor coupled to each of said first input means of said tri-state gates.

13. The mode selecting circuit of claim 9 in which said tri-state devices have input means for receiving inhibit signals; and wherein said sensing means is coupled to said input means for supplying said inhibit signals thereto.

14. The mode selecting circuit of claim 11, in which said gate means comprise open-collector devices, and further including a pull-up resistor coupled to each of said first input means of said gate means.

* * * * *